United States Patent
Sugata

(10) Patent No.: US 6,732,824 B2
(45) Date of Patent: May 11, 2004

(54) WORKING VEHICLE WITH TRANSVERSE TRAVEL SYSTEM

(75) Inventor: Takashi Sugata, Osaka (JP)

(73) Assignee: TCM Corporation, Osaka (JP)

( * ) Notice: Subject to any disclaimer, the term of this patent is extended or adjusted under 35 U.S.C. 154(b) by 0 days.

(21) Appl. No.: 10/070,127

(22) PCT Filed: Jun. 28, 2001

(86) PCT No.: PCT/JP01/05601

§ 371 (c)(1),
(2), (4) Date: Feb. 27, 2002

(87) PCT Pub. No.: WO02/10060

PCT Pub. Date: Feb. 7, 2002

(65) Prior Publication Data

US 2002/0148669 A1 Oct. 17, 2002

(51) Int. Cl.[7] .................................................. B60K 1/00
(52) U.S. Cl. ........................................ 180/65.5; 180/411
(58) Field of Search ................................ 180/408, 409, 180/410, 411, 65.5

(56) References Cited

U.S. PATENT DOCUMENTS

| | | | | | |
|---|---|---|---|---|---|
| 3,087,564 A | * | 4/1963 | Quayle | ........................ | 180/411 |
| 3,540,104 A | * | 11/1970 | Duffy | ........................... | 492/13 |
| 3,556,241 A | * | 1/1971 | Mitchell | ..................... | 180/411 |
| 3,601,422 A | * | 8/1971 | Woods | ........................ | 180/411 |
| 3,696,881 A | * | 10/1972 | Gordon | ...................... | 180/411 |
| 4,823,899 A | | 4/1989 | Ron | | |
| 5,456,332 A | * | 10/1995 | Borenstein | .................. | 180/411 |
| 5,699,873 A | * | 12/1997 | Moriya et al. | .......... | 180/411 X |
| 5,722,504 A | * | 3/1998 | Gaetani | ...................... | 180/411 |
| 6,206,127 B1 | * | 3/2001 | Zakula, Sr. et al. | ..... | 180/411 X |
| 6,378,641 B1 | * | 4/2002 | Hanaoka et al. | ........ | 180/411 X |
| 6,557,658 B1 | * | 5/2003 | Enmeiji et al. | ............. | 180/236 |
| 2003/0070862 A1 | * | 4/2003 | Tartara | ....................... | 180/411 |

FOREIGN PATENT DOCUMENTS

| | | |
|---|---|---|
| JP | 2-306879 | 12/1990 |
| JP | 5-246346 | 9/1993 |
| JP | 10-244951 | 9/1998 |

* cited by examiner

*Primary Examiner*—Bryan Fischmann
(74) *Attorney, Agent, or Firm*—Fildes & Outland, P.C.

(57) ABSTRACT

Front wheels and rear wheels are mounted to a vehicle body to be steerable by 90 degrees. Right and left front wheels are connected to the turning members which are capable of rotating around vertical axes in relation to the vehicle body though individual electric drive motors. Each electric motor has an external casing integrally formed with each turning member, and allows a drive shaft and a rotor to be accommodated and rotatable therein. Each drive shaft is connected to the front wheel, and an apparatus for rotating the turning member is provided. This allows the driving front wheels to be steered straight sideways and the electric motor to be readily assembled and arranged compact.

4 Claims, 4 Drawing Sheets

WORKING VEHICLE WITH TRANSVERSE TRAVEL SYSTEM

CROSS REFERENCE TO RELATED APPLICATIONS

This application is a continuation under 35 USC 120 of PCT International Application PCT/JP01/05601, filed Jun. 28, 2001. International Application PCT/JP01/05601 published as WO 02/10060, which is not in English.

TECHNICAL FIELD

This invention relates to a service vehicle having a lateral travel system which can be switched to a lateral travel mode.

BACKGROUND ART

Conventionally, service vehicles having a lateral travel system have primarily been found among large size conveyance vehicles and some loaders, and reach style electric vehicles as forklifts. In addition, there exists a side forklift with a mast and forks installed sideways in relation to the movement direction of the vehicle to allow the vehicle to handle elongated objects. However, there are no counter balance type forklifts that can move sideways and function like a side forklift in addition to such tasks as generally required. To realize this type of forklift, the front wheels or driving wheels are required to be steerable sideways.

Therefore, a conventional forklift 1, shown in FIG. 5, has right and left front wheels 3 (driving wheels) in a front part of a vehicle body 2, right and left rear wheels 4 in a rear part of the vehicle body 2, and a driver's compartment 5 on an upper front part of the vehicle body 2. A mast 6 capable of vertically extending and retracting is located at a front end of the vehicle body 2 to be able to tilt in a front-and-rear direction through a front wheel axle 7 extending in a vehicle width direction. Additionally, tilt cylinders 8 enabling the mast 6 to tilt forward and backward are placed between the vehicle body 2 and the mast 6.

The mast 6 comprises a pair of right and left outer frames 9 and a pair of right and left inner frames 10 capable of vertical movement by being guided by the outer frames 9. Disposed between the outer frames 9 and the inner frames 10 is a lift cylinder 11. Additionally, lift brackets 12 capable of vertical movement by being guided on the inner frames 10 are provided, and a pair of right and left forks 13 are secured to the lift brackets 12 through a pair of upper and lower finger bars.

The above mentioned driver's compartment 5 includes a seat 15, a steering wheel 16 located in front of the seat 15, and a headguard 19 disposed thereabove through front pipes 17 and rear pipes 18 which are erected on the vehicle body 2. A counterweight 20 is located in the rear of the seat 15 on the vehicle-body 2.

However, since the right and left front wheels 3 are driven in common by a same travel drive system, the above mentioned conventional forklift 1 cannot effect straight-sideways steering of the front wheels, thus being unable to move laterally.

DISCLOSURE OF INVENTION

It is an object of the present invention is to provide a service vehicle with a lateral travel system, in which driving front wheels can be steered straight sideways and a driving unit can be readily assembled and arranged compact.

To achieve this object, a service vehicle with a lateral travel system according to the present invention comprises right and left front wheels and right and left rear wheels mounted to a vehicle body, respectively to be capable of steering by 90 degrees, each of the pair of right and left front wheels being connected, through an electric drive motor, to a turning member capable of rotating around a vertical axis on the vehicle body, wherein each electric drive motor has an external casing integrally formed with the turning member, which external casing is configured to allow a rotor and a drive shaft to freely rotate therein, the rotor and drive shaft being connected to the front wheel, and means for rotating the turning member is provided.

According to the above mentioned configuration, the electric motor can be assembled with the turning member by inserting, from an outward position on a non-load side, the rotor and the drive shaft into the external casing which is integrally formed with the turning member, with other to-be-fixed parts having been fixed inside the casing. Afterwards, a loaded end of the drive shaft can be connected to the front wheel on each right and left sides. Since the outer casing of the electric motor is thus integrally formed with the turning member and is designed such that the rotor and the drive shaft can freely rotate therein, and this drive shaft is connected to the front wheel, the electric motor can be readily assembled and arranged to be compact in size.

During normal travel, both the right and left front wheels and right and left rear wheels are steered either forward or backward. When switching from a normal travel mode to a lateral travel mode, the rotating means is first activated to turn the turning members around the vertical axes, so that the front wheels can be steered by 90 degrees (straight sideways) in relation to the vehicle body. The front wheels, which are integral with each electric motor, can be steered by 90 degrees both easily and smoothly. After having steered the front wheels or the driving wheels straight sideways, the front wheels are driven in either of to-and-fro directions thereof by the electric motor, whereby the service vehicle can travel laterally either to the right or the left with respect of the vehicle body. At this time, the rear wheels are allowed for follow-up steering by means of a turning castor system or can be forcedly steered following the front wheels.

According to a preferred embodiment of the present invention, a mast is disposed at the front end of the vehicle body and forks are secured to the mast.

According to this embodiment, during a normal travel, both the right and left front wheels and the right and left rear wheels are steered in a front-and-rear direction. A lift lever is then used to raise or lower the forks along the mast to accomplish expected fork operations. This method allows the service vehicle, in addition to normal fork operations, to travel laterally by steering the driving front wheels straight sideways, for example, to readily transport elongated objects using the forks.

BEST MODE FOR CARRYING OUT THE INVENTION

Figure 5:
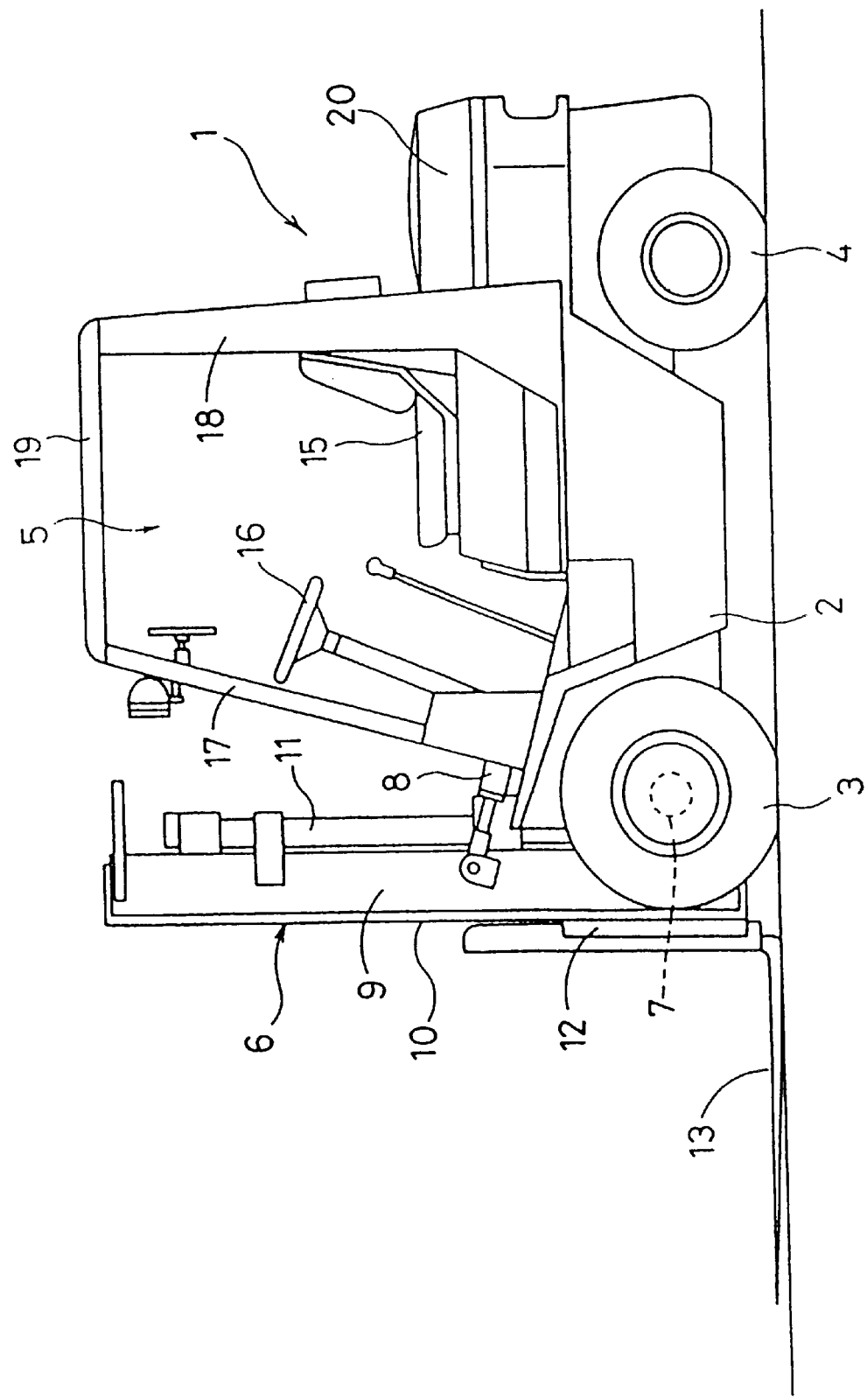
FIG. 5 is a side view of a forklift of a conventional art.

An embodiment of the present invention will be explained below using FIGS. 1 through 4. In these embodiments, components identical or almost identical to those of the conventional art (FIG. 5) are labeled with like reference symbols and detailed explanations thereof are omitted.

Reference symbol 1 shows a forklift as an example of a service vehicle, 2 a vehicle body, 3 a front wheel, 4 a rear wheel, 5 a driver's compartment, 6 a mast, 8 a tilt cylinder, 9 an outer frame, 10 an inner frame, 11 a lift cylinder, 12 a lift bracket, 13 a fork, 15 a seat, 16 a steering wheel, 17 a front pipe, 18 a rear pipe, 19 a headguard and 20 a counterweight. The mast 6 is installed on the vehicle body 2 to be able to swing forward or backward through a linking axle 21 in the direction of the width of the vehicle.

Each of the right and left front wheels 3 and the right and left rear wheels 4 are mounted to be steerable by 90 degrees (steerable straight sideways) in relation to the vehicle body 2. Each vertical axle 26 is installed through a bearing 25 to pivot around a vertical axis 27 on both sides of the front part of the vehicle body 2. Additionally, a horizontal plate 28a of an inverted L-shaped turning member 28 is provided at the bottom of the vertical axis 26, whereby the turning member 28 is able to rotate around the vertical axis 27 of the vehicle body 2.

Each of the front wheels 3 is mounted to the vertical plate portion 28b of the turning member 28 through an electric driving motor 30. That is, the electric motor 30 has an external casing 31 which is integrally formed with the vertical plate portion 28b. This external casing is tube shaped and is integrated with the vertical plate portion 28b by welding or the like. The parts to be fixed such as a stator 32 are secured on the inner circumference surface of the external casing 31. As a result, the vertical plate portion 28b also serves as an end bracket on a load side of the electric motor 30. Additionally, a bearing through hole 29 is formed in each vertical plate portion 28b in a positional relation to oppose each other with the center of the tube portion of the casing therebetween.

The external casing 31 is arranged to freely accommodate therein a drive shaft 34 together with such parts as a rotor 33. Upon such accommodation, a bearing 35 is placed in the through hole 29. The non-load side end of the drive shaft 34 is supported to be capable of turning by an end bracket 36 through a bearing 37, and the end bracket 36 is detachably attached to a free end of the external casing 31 through a connector such as a bolt 38.

A rim 3A for the front wheel 3 is detachably attached to the load side end of the drive shaft 34 through a turnable flange 39 and a connector 40. Consequently, each of the right and left front wheels 3 is connected to the drive shaft 34 of the electric motor 30. Upon this connection, the front wheels 3 are positioned substantially immediately under the vertical axes 27. Further, parts such as an encoder 41 are provided on the non-load side end of the drive shaft 34. An example of an electric motor 30 is thus constituted by the above mentioned parts 31 through 41.

A battery 45 is loaded on the vehicle 2 and a controller 46 is attached to the battery. Cables 47 from the controller 46 are then connected to each of the electric motors 30.

A means 50 for rotating the turning members 28 is provided. That is, the right and left turning members 28 are connected by a link 51 or the like, and are rotated by a common turning cylinder 52 to change the direction of the right and left front wheels 3 to straight sideways. An example of the rotating means 50 is thus constituted by the above mentioned 51, 52, and others.

In each of the right and left rear wheels 4, a rim 4A is attached to be capable of turning on a vertical plate of the turning member 55, and a horizontal plate portion of the turning member 55 is attached to be capable of rotating around vertical axis 58 in relation to the body of the vehicle 2 through a bearing 56 and a vertical axis 57. At this time, the right and left rear wheels 4 are positioned substantially immediately under the vertical axes 58. Consequently, the right and left rear wheels 4 are allowed for follow-up turning by means of a turning castor system.

The following is the explanation of the operation of the above mentioned example.

Figure 1:
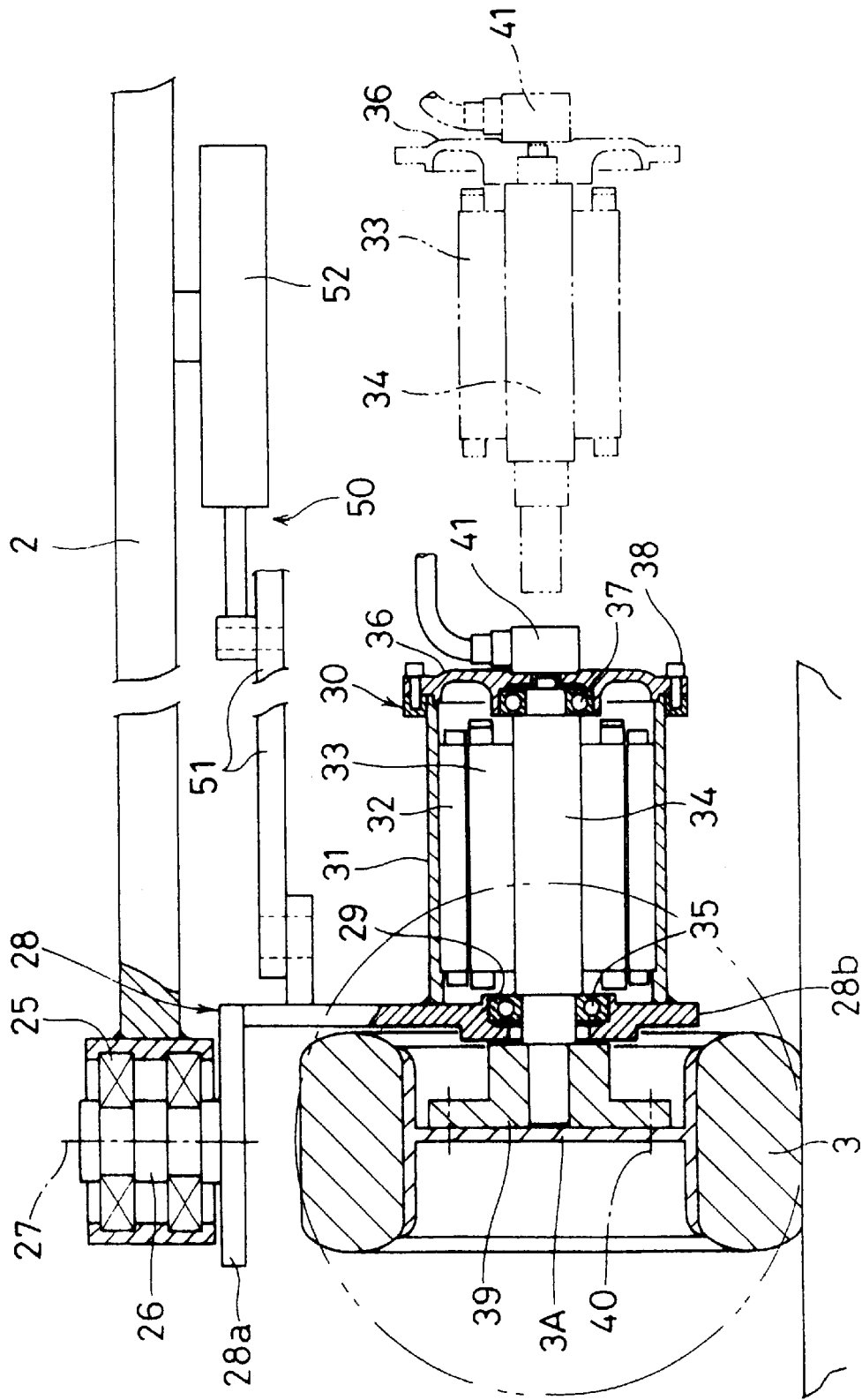
FIG. 1 is a top view of a partially cutaway cross section of a front wheel area of a service vehicle with a lateral travel system, showing an embodiment of the present invention.

In assembling the electric motor 30 on the turning member 28, the external casing 31 of the electric motor 30 has been integrally formed with the vertical plate 28b, and to-be-secured parts like the stator 32 are fixed on the surface of the inner circumference of the external casing 31. The rotor 33 and the drive shaft 34, as shown by virtual lines in FIG. 1, are placed outside on the non-load side of the external casing 31 and then inserted into the external casing 31 from such outside position.

This insertion enables the drive shaft 34 to be inserted into the bearing 35 placed in the bearing through hole 29, and the stator 32 to oppose the rotor 33. Further, the end bracket 36 rotatably supporting the non-load side end of the drive shaft 34 is abutted to a free end of the outer casing 31, and then secured thereto through the connector 38.

After the electric motor 30 has thus been assembled, the rims 3A for the front wheels 3 are attached at the loaded side end of the drive shaft 34 through the turnable flange 39 and a connector 40. As shown by solid lines in FIG. 1, this enables the right and left front wheels 3 to be connected to the drive shaft 34 of the electric motor 30.

As explained above, the drive shafts 34, together with the rotors 33, are accommodated into the external casings 31 of the electric motors, which have been integrally formed with the tuning members 28, and are connected to the front wheels 3, so that the electric motors 30 can be readily assembled and arranged compact in size.

Figure 2:
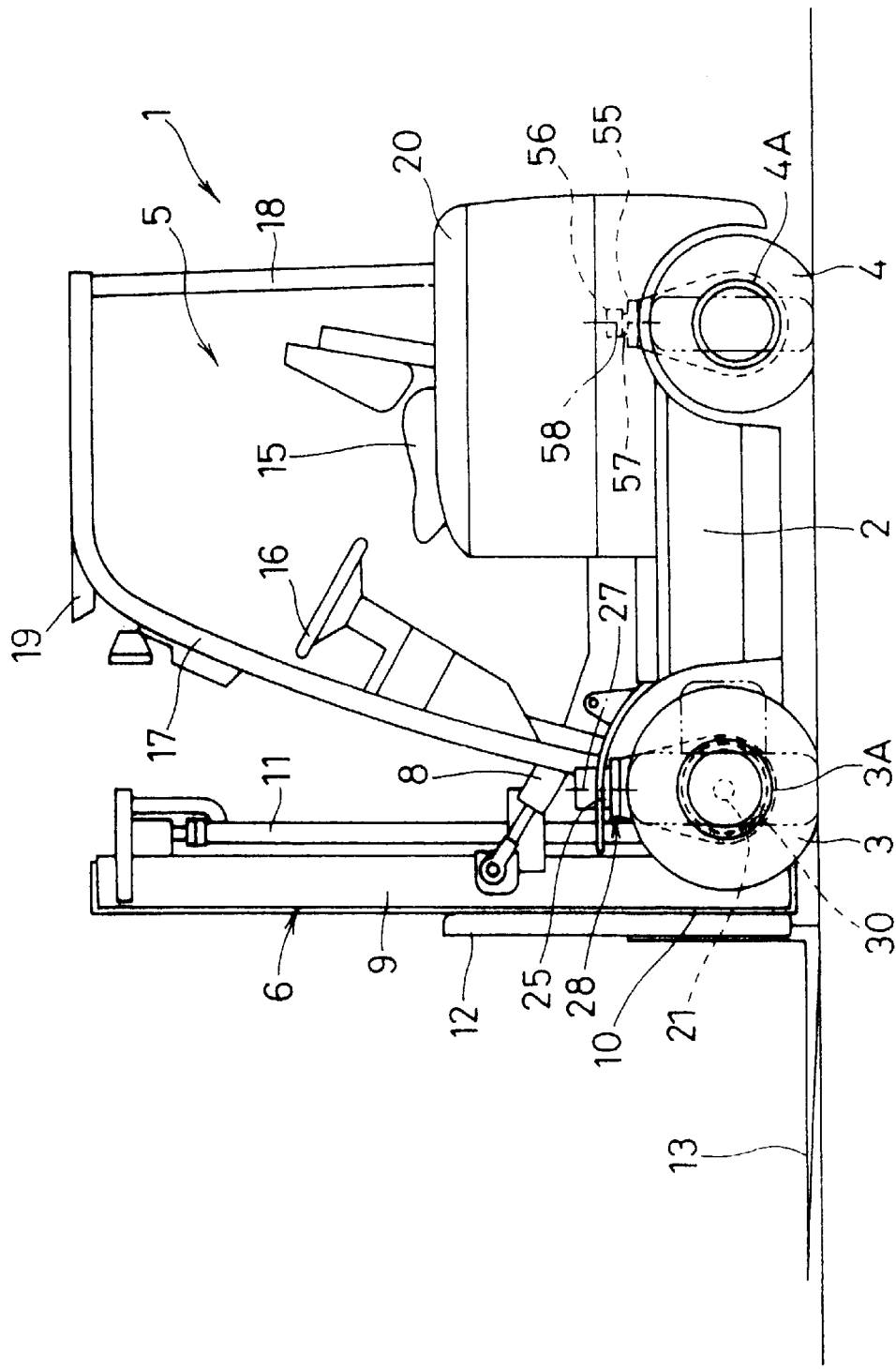
FIG. 2 is a side view of the service vehicle with a lateral travel system during normal travel.
Figure 3:
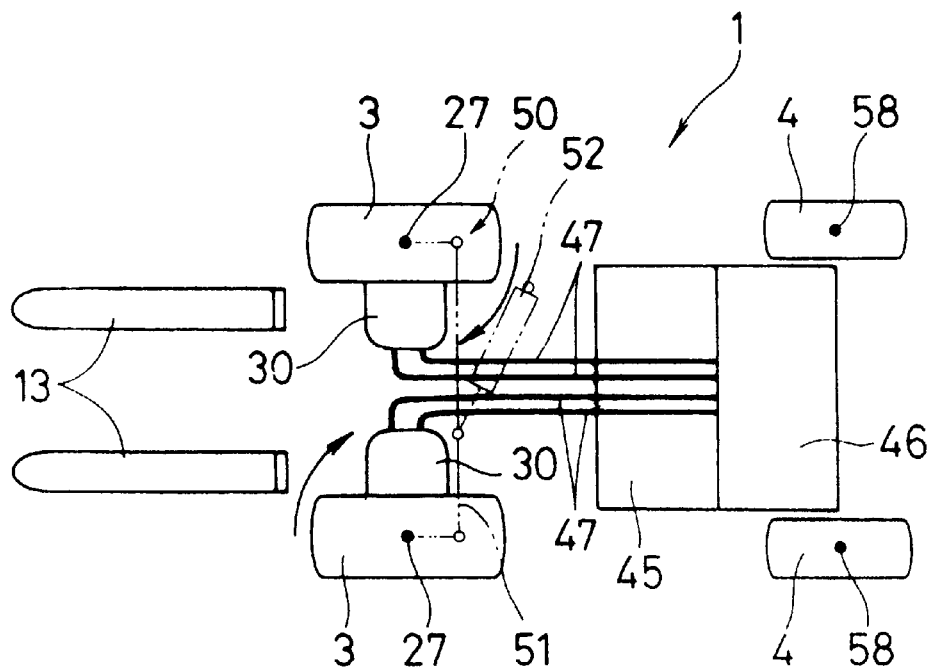
FIG. 3 is a schematic top view of the service vehicle with a lateral travel system during normal travel.
Figure 4:
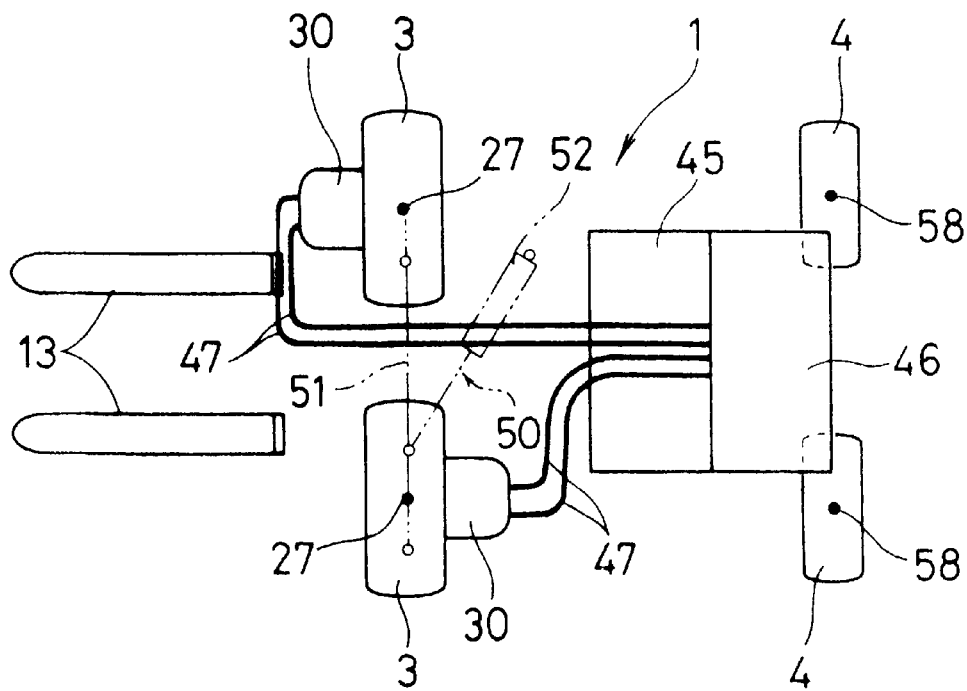
FIG. 4 is a schematic top view of the service vehicle with a lateral travel system during lateral travel.

Indicated by the solid lines in FIGS. 1 and 2 and in FIG. 3 are a normal travel, in which the right and left front wheels 3 and the right and left rear wheels 4 are in the front-and-rear direction of the vehicle body. The forklift 1 can be driven to travel by an operator sitting on the seat 15 of the driver's seat 5 by manipulating the steering wheel 16. That is, the forklift 1 can move forward and backward by supplying electrical power from the battery 45 to the electric motors 30 by the cables 47 after controlling the electrical power with the controller 46, thereby to drive the front wheels in the front-and-rear direction.

Then, by operating a lifting lever to actuate the lift cylinders 11 to raise and or lower the forks 13 through the lift brackets 12 along the mast 6, the expected fork operations can be executed. Further, by operating a tilting lever to actuate the tilt cylinders 8 to move the mast 6 around the linking axle 21 (that is to tilt), postures of the forks 13 can be varied through the lift brackets 12 and the like.

When changing from a normal travel operation to a lateral travel operation, a lever-style lateral travel mode switch (not depicted in the drawing) is operated to tilt, thereby to move the turning cylinder 52 which is a rotating means. This allows the turning members 28 to rotate around the vertical axes 27 through the link 51, thus steering the front wheels 3 by 90 degrees in relation to the vehicle body 2 (straight sideways), as shown by the solid lines in FIGS. 1 and 2, and in FIG. 4.

Since each front wheel 3 is integral with each electric motor 30, each front wheel 3 can readily and smoothly be steered by 90 degrees in relation to the vehicle. Further, since the front wheels 3 are positioned substantially immediately under the vertical axes 27, the front wheels 3 can be made compact and steerable by 90 degrees.

When the front wheels 3 are steered as stated above, a sensor detects this change of direction of these front wheels 3, and activates an indicator lamp, thereby allowing the lateral travel mode to be effected. Therefore, by taking electrical power from the battery 45 and supplying the electrical power to each electric motor 30 through the cables 47 after the electrical power has been controlled by the controller 46, the front wheels 3 can be driven in either of to-and-fro directions thereof, thereby allowing the forklift 1 to laterally travel in either right or left directions. At the same time, the right and left rear wheels 4 having the turning castor system can perform a follow-up turning.

This lateral travel capability facilitates it, for example, to transport elongated objects with the forks 13. Correction of straightness in the lateral travel can be easily effected by tilting the lever forward or backward to slightly actuate the turning cylinder 52 in order for fine adjustment of the angle of the front wheels 3.

Although the right and left rear wheels 4 used in the embodiment mentioned above are of a type having a castor system capable of performing a follow-up turning of the wheels, they may be of the same type as for the front wheels 3, which allows the wheels to be forcedly steered by a cylinder or the like. Alternatively, one of the right and left rear wheels 4 may be of a type performing steering by means of a steering wheel, while the other being of a follow-up castor type. In this case, when switching to a lateral travel mode, one of the rear wheels 4 is forcedly steered by the cylinder or the like.

In the above mentioned embodiment, the rotating means 50 is used in common to rotate the right and left front wheels simultaneously. However, another system may be employed, which rotates the right and left front wheels 3 separately by respective rotating means.

What is claimed is:

1. A service vehicle with a lateral travel system, comprising:

right and left front wheels and right and left rear wheels mounted to a vehicle body, respectively and steerable within a 90 degree range of the vehicle body, each of said right and left front wheels being connected to a turning member capable of rotating around a vertical axis with respect to the vehicle body, via an electric drive motor, the turning member comprising a vertical plate portion, and a rotating means for rotating the turning member, wherein, a bearing through hole is formed in the vertical plate portion of the turning member, a bearing is placed in the bearing through hole, a loaded side end of a drive shaft is inserted in the bearing, the drive shaft for each front wheel being connected to the front wheels, and an external casing of each electric drive motor is integrally formed with the turning member, and the external casing is configured to allow a rotor and a drive shaft to freely rotate therein, a non-load side end of the drive shaft is supported by an end bracket adapted to turn about a bearing, and the end bracket is detachably attached to a free end of the external casing through a connector.

2. A service vehicle with a lateral travel system according to claim 1, wherein the external casing is integrated with the vertical plate portion by welding.

3. A service vehicle with a lateral travel system according to claim 1, wherein an encoder is provided on the non-load side end of the drive shaft.

4. A service vehicle with a lateral travel system according to claim 1, wherein each front wheel is positioned immediately under a vertical axis of a bearing pivotably supported on the turning member.

\* \* \* \* \*